United States Patent
Levin et al.

(10) Patent No.: US 9,144,109 B2
(45) Date of Patent: Sep. 22, 2015

(54) METHODS AND SYSTEMS FOR MULTI-DIRECTIONAL TIME PRESERVATION DISTRIBUTION IN MULTI-COMMUNICATION CORE DEVICES

(71) Applicant: Intel Corporation, Santa Clara, CA (US)

(72) Inventors: Tirosh Levin, Hadera (IL); Yaron Alpert, Hod Hasharoni (IL); Chandru Aswani, Bangalore (IN); Gil Zukerman, Hod-HaSharon (IL); Saket Jha, Bangalore (IN); Haim Rochberger, Tel Mond (IL)

(73) Assignee: Intel Corporation, Santa Clara, CA (US)

( * ) Notice: Subject to any disclaimer, the term of this patent is extended or adjusted under 35 U.S.C. 154(b) by 8 days.

(21) Appl. No.: 13/722,920

(22) Filed: Dec. 20, 2012

(65) Prior Publication Data

US 2014/0179366 A1    Jun. 26, 2014

(51) Int. Cl.
*H04W 88/06* (2009.01)
*H04W 56/00* (2009.01)

(52) U.S. Cl.
CPC .............. *H04W 88/06* (2013.01); *H04W 56/00* (2013.01); *Y02B 60/50* (2013.01)

(58) Field of Classification Search
USPC ..................... 455/550.1, 552.1, 456.1, 404.1; 370/336, 331, 329; 709/225; 726/22; 713/320; 714/10
See application file for complete search history.

(56) References Cited

U.S. PATENT DOCUMENTS

| | | | |
|---|---|---|---|
| 2008/0182571 A1* | 7/2008 | Patrick et al. | 455/423 |
| 2010/0062758 A1 | 3/2010 | Proctor, Jr. et al. | |
| 2012/0069131 A1* | 3/2012 | Abelow | 348/14.01 |
| 2012/0178448 A1 | 7/2012 | Yuk et al. | |
| 2012/0307698 A1 | 12/2012 | Tavildar et al. | |
| 2013/0029630 A1* | 1/2013 | Salkini et al. | 455/404.1 |
| 2013/0337765 A1* | 12/2013 | Salkini et al. | 455/404.1 |

FOREIGN PATENT DOCUMENTS

WO    WO-2014098977 A1    6/2014

OTHER PUBLICATIONS

"International Application Serial No. PCT/US2013/046095, International Search Report mailed Aug. 27, 2013", 3 pgs.
"International Application Serial No. PCT/US2013/046095, Written Opinion mailed Aug. 27, 2013", 5 pgs.

* cited by examiner

*Primary Examiner* — Diane Mizrahi
(74) *Attorney, Agent, or Firm* — Schwegman Lundberg & Woessner, P.A.

(57) ABSTRACT

A system and method for the distribution of time signals is available for devices with multiple communication cores. An embodiment may or may not use a centralized manager for the management of time preservation. When a communication core in a multiple communication core device requires timing information, it may request the time information from another communication core or from the centralized manager. The centralized manager, if present, can obtain time information from an external source or from one of the communication cores. The result can be reduced power consumption at a lower cost.

18 Claims, 4 Drawing Sheets

METHODS AND SYSTEMS FOR MULTI-DIRECTIONAL TIME PRESERVATION DISTRIBUTION IN MULTI-COMMUNICATION CORE DEVICES

TECHNICAL FIELD

Embodiments pertain to wireless communications. Some embodiments pertain to wireless communication devices that are capable of communicating on multiple communication cores.

BACKGROUND ART

Mobile communication devices such as phones, tablets, e-book readers, laptop computers, and the like, have become increasingly common. Many such devices have multiple cores, such as computing cores and communication cores. That is, they are able to transmit and receive data via a variety of different methods, such as cellular, WiFi, Bluetooth, near-field communications (NFC), high-definition radio (HDR), global navigation satellite systems (GNSS), and the like. Each of these communication cores needs to maintain time preservation in order to operate properly, without using an excessive amount of power.

DESCRIPTION OF THE EMBODIMENTS

Figure 1:
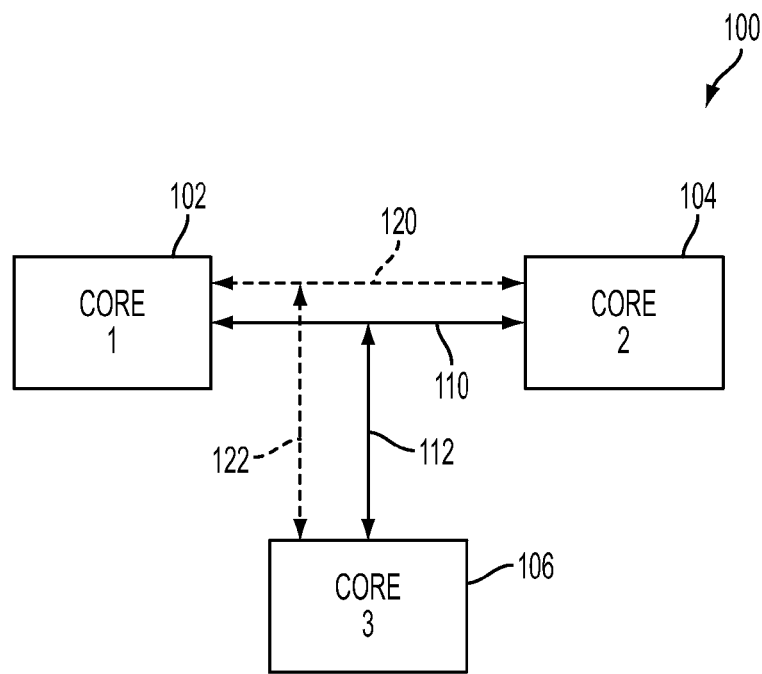
FIG. 1 is a block diagram presenting an overview of an embodiment.

The following description and the drawings sufficiently illustrate specific embodiments to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for, those of other embodiments. Embodiments set forth in the claims encompass all available equivalents of those claims.

In the following detailed description, numerous specific details are set forth in order to provide a thorough understanding of the invention. However, it will be understood by those skilled in the art that the present invention may be practiced without these specific details. In other instances, well-known methods, procedures, components, and circuits have not been described in detail so as not to obscure embodiments of the present invention.

Although embodiments of the invention are not limited in this regard, the terms "plurality" and "a plurality" as used herein may include, for example, "multiple" or "two or more." The terms "plurality" or "a plurality" may be used throughout the specification to describe two or more components, devices, elements, units, parameters, and the like. For example, "a plurality of stations" may include two or more stations.

The 3rd Generation Partnership Project (3GPP) is a collaboration agreement established in December 1998 to bring together a number of telecommunications standards bodies, known as "Organizational Partners," that currently include the Association of Radio Industries and Business (ARIB), the China Communications Standards Association (CCSA), the European Telecommunications Standards Institute (ETSI), the Alliance for Telecommunications Industry Solutions (ATIS), the Telecommunications Technology Association (TTA), and the Telecommunication Technology Committee (TTC). The establishment of 3GPP was formalized in December 1998 by the signing of the "The 3rd Generation Partnership Project Agreement."

3GPP provides globally applicable standards as Technical Specifications and Technical Reports for a 3rd Generation Mobile System based on evolved GSM core networks and radio access technologies that they support (e.g., Universal Terrestrial Radio Access (UTRA) for both Frequency Division Duplex (FDD) and Time Division Duplex (TDD) modes). 3GPP also provides standards for maintenance and development of the Global System for Mobile communication (GSM) as Technical Specifications and Technical Reports including evolved radio access technologies (e.g., General Packet Radio Service (GPRS) and Enhanced Data rates for GSM Evolution (EDGE)). Technical Specifications for current standards related to mobile telephony are generally available to the public from the 3GPP organization.

3GPP is currently studying the evolution of the 3G Mobile System and considers contributions (views and proposals) directed toward the evolution of the UTRA Network (UTRAN). A set of high-level requirements was identified by 3GPP workshops including: reduced cost per bit; increased service provisioning (i.e., more services at lower cost with better quality); flexibility of use of existing and new frequency bands; simplified architecture with open interfaces; and reduced/reasonable terminal power consumption. A study on the UTRA & UTRAN Long Term Evolution (UTRAN-LTE, also known as 3GPP-LTE and E-UTRA) was started in December 2004 with the objective to develop a framework for the evolution of the 3GPP radio-access technology towards a high-data-rate, low-latency and packet-optimized radio-access technology. The study considered modifications to the radio-interface physical layer (downlink and uplink) such as means to support flexible transmission bandwidth up to 20 MHz, introduction of new transmission schemes, and advanced multi-antenna technologies. 3GPP-LTE is based on a radio-interface incorporating orthogonal frequency division multiplex (OFDM) techniques. OFDM is a digital multi-carrier modulation format that uses a large number of closely-spaced orthogonal sub-carriers to carry respective user data channels. Each sub-carrier is modulated with a conventional modulation scheme, such as quadrature amplitude modulation (QAM), at a (relatively) low symbol rate when compared to the radio frequency (RF) transmission rate. In practice, OFDM signals are generated using the fast Fourier transform (FFT) algorithm.

Mobile communication devices may now have multiple communication cores, such as cellular (including 3G and 3GPP-LTE), WiFi, Bluetooth, near-field communications (NFC), high-definition radio (HDR), global navigation satellite systems (GNSS), and the like. Each of these communication cores needs to maintain time preservation in order to operate properly. In many current designs, each communication core generates its own time measurement at the required accuracy of the communication core.

In other mobile communication devices, a single source (such as the cellular radio) is used to provide a clock signal for all the communication radios in the mobile communication device. This clock signal is unidirectional and usually requires that the clock source be on at all times, possibly affecting battery life in a negative manner, as that radio cannot enter an idle mode. It could also be set to a low power state, but then it affects the accuracy and availability of the clock source.

As mobile communication devices acquire more and more capabilities, the battery life of the device becomes a more important issue. Users do not wish to have to keep their mobile communication device plugged in all the time in order to maintain a charge on the device. One way to increase battery life is to reduce the power consumption of the mobile communication device. One such way to reduce power consumption is to reduce the power used for clock generation on the device. It may also be desirable to lower the costs of components of a mobile communication device. One such method of lowering costs may be the ability to use a reference clock that is not as accurate, augmented by using other timing sources. In addition, the use of multiple communication cores as timing sources could be used to increase the availability of accurate time sources, as opposed to the use of a single source for a clock signal.

An embodiment operates by dynamically selecting an accurate time preservation source according to predefined Key Performance Indicators (KPI), including availability, accuracy, latency, noise, and reliability. Availability may just taken into account if the source is currently available. Accuracy may be measured in a variety of different manners. In one embodiment, accuracy may be defined as the maximum error between the time provided relative to the absolute time. Latency may be defined as the time it takes for the core to respond to a request. The noise level may include factors such as clock jitter and the like. Reliability may be an estimate of the stability of the source. It should be understood that each client may have its own weighting of the indicators. Therefore, each client may add another indicator to the KPI or ignore an indicator that other clients use. Thus, it is possible for two different clients to choose different sources because of the different indicators.

An embodiment may have two forms of time preservation: 1) coarse time, which provides an accuracy-limited interface that provides a software level interface for time reporting; and 2) fine time, which provides a more accurate interface that uses both a software level interface and hardware level signaling for the reporting of accurate time. In addition, a communication core may allow querying of its current time preservation KPI values and capabilities.

As an example, a GNSS such as the global positioning system (GPS) requires a very accurate clock in order to reduce time to first fix (TTFF)—the time required to acquire satellite signals to calculate position. If the GNSS is active and another communication core is idle, the GNSS can be used to provide an accurate time preservation interface to the other communication cores. But if the other communication core is active and the GNSS is idle, the other communication core may provide the time preservation interface for the GNSS.

FIG. 1 is a block diagram illustrating a general overview of an embodiment. Mobile communication device 100 comprises communication core 102, communication core 104, and communication core 106. Each of the communication cores may communicate via one of a variety of different methods, such as cellular (including, but not limited to, 3G and 3GPP-LTE), WiFi, Bluetooth, near-field communications (NFC), high-definition radio (HDR), global navigation satellite systems (GNSS), and the like. For example, communication core 102 may be for LTE communications, communication core 104 may be for WiFi communications, and communication core may be for GNSS such as the Global Positioning System (GPS). Each of the communication cores is arranged to communicate to a different device using a specific protocol. For example, communication core 102 is capable of communicating with an evolved Node B (eNB), communication core 104 is capable of communicating with a WiFi Access Point, and communication core 106 is capable of communicating with a GPS satellite. It should be understood that there may also be additional communication cores present in the system and that communication cores 102, 104, and 106 may be any combination of communication cores.

Arrows 110 and 112 represent a software-level interface that links two or more of communication cores 102, 104, and 106. Arrows 120 and 122 represent a hardware level signal that couple together two or more of communication cores 102, 104, and 106. Each of communication cores 102, 104, and 106 can communicate to another of the communication cores 102, 104, and 106 for a time preservation assistance and aiding session. Each communication core can decide which of the other communication cores will be the time preservation source, so the other communication cores will be the clients of the time preservation source. The communication protocol can switch with the preservation source between the communication cores based on specific KPI criteria. For example, a client core may wish to switch between preservation sources when a more accurate preservation source become available. Or a client more may merely be switching off of one preservation source when the source becomes unavailable.

While three communication cores are illustrated in FIG. 1, it should be understood that a mobile communication device 100 may include a different number of communication cores and the concepts presented in FIG. 1 may be extended in such situations to the number of communication cores actually present in a particular mobile communication device.

Figure 2:
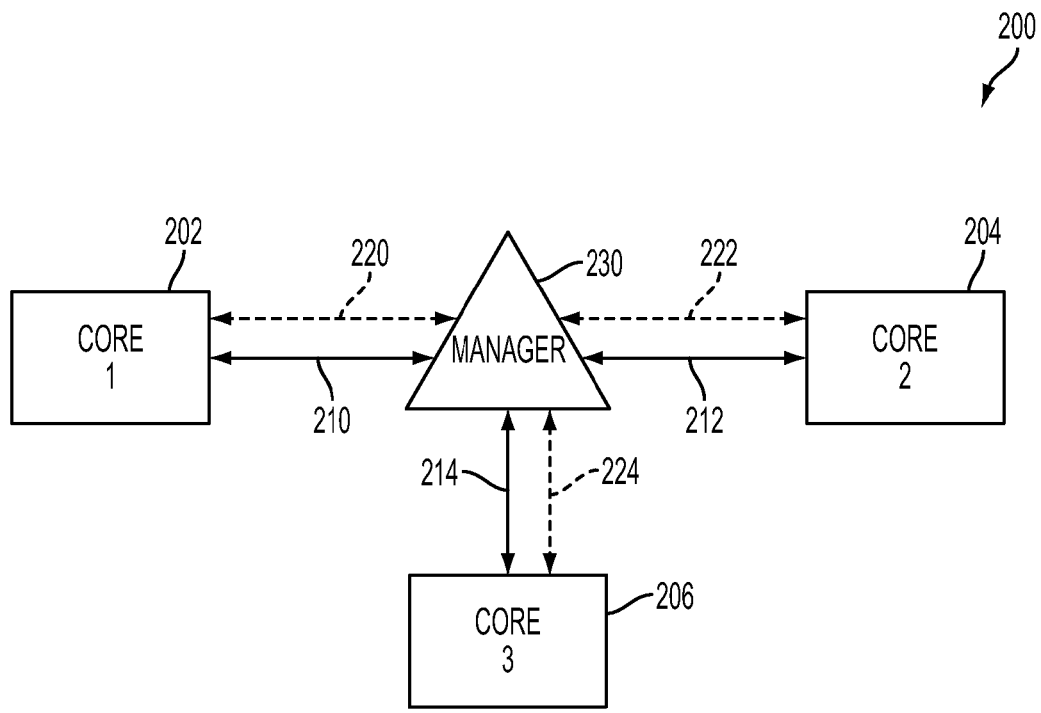
FIG. 2 is a block diagram presenting an overview of another embodiment.

FIG. 2 illustrates another embodiment that uses a centralized component. Mobile communication device 200 comprises communication cores 202, 204, and 206. Also present is time preservation assistance and aiding manager 230. Arrows 210, 212, and 214 represent a software level interface that links each of communication cores 202, 204, and 206 to time preservation assistance and aiding manager 230. Arrows 220, 222, and 224 represent a hardware level signal that couples each of communication cores 202, 204, and 206 to a time manager, termed the time preservation assistance and aiding manager 230.

Time preservation assistance and aiding manager 230 contains its own processing and clock resources for preserving the time. In one embodiment, time preservation assistance and aiding manager 230 is a separate device from communication cores 202, 204, and 206. In such a situation, time preservation assistance and aiding manager 230 preserves accurate time based on specific KPI criteria. In another embodiment, time preservation assistance and aiding manager 230 may actually reside in any of the existing communication cores 202, 204, and 206.

The time preservation assistance and aiding manager 230 is configured to decide which of the communication cores will be the time preservation source so the remaining communication cores can be the clients of the time preservation source. The time preservation assistance and aiding manager 230 can switch the time preservation source between the communication cores 202, 204, and 206 based on specific KPI criteria. In general, time preservation assistance and aiding manager 230 should always try to have the "best" time. That is, the time that is the most accurate, most reliable, have the least jitter, etc. It can choose its algorithm to ensure that it has the "best" time. In one embodiment, time preservation assistance and aiding manager 230 may periodically query communication cores 202, 204, and 206 and decide whether to ask for time assistance to improve its own time.

If communication core 202 is the time preservation source and communication cores 204 and 206 are clients, both communication core 204 and communication core 206 can turn off or otherwise reduce the power consumption of a clock contained within the communication core, because communication core 204 and communication core 206 will be receiving time information from the time preservation source. Time preservation assistance and aiding manager 230 contains interfaces at both the hardware and software levels that can be used to provide time preservation services to the various communication cores.

Time preservation assistance and aiding manager 230 may also be configured to determine a time preservation source for time preservation assistance and aiding. This method can be based on any predefined Time Preservation KPIs criteria (e.g., accurate clock, availability, validity). This will be presented in further detail below.

While three communication cores are illustrated in FIG. 2, it should be understood that a mobile communication device 200 may include a different number of communication cores and the concepts presented in FIG. 2 may be extended in such situations to the number of communication cores actually present in a particular mobile communication device.

Figure 3:
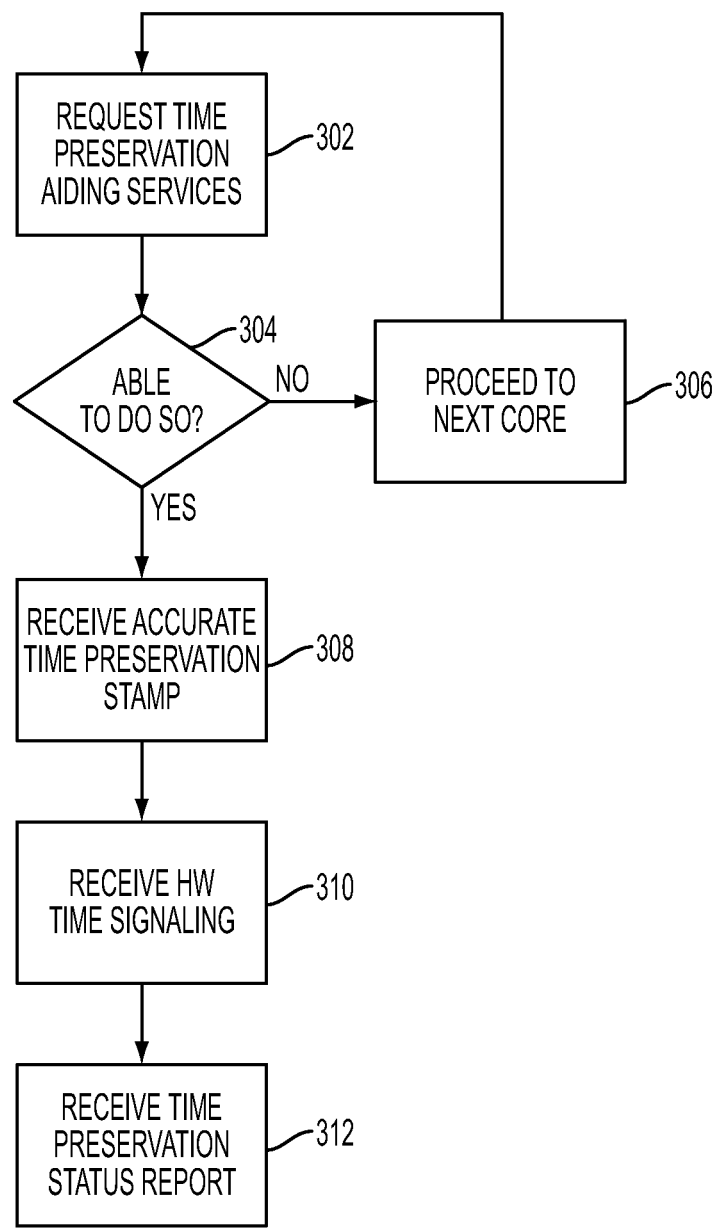
FIG. 3 is a flow chart illustrating the operation of an exemplary embodiment.

With reference to FIG. 3, a flowchart illustrating the operation of an embodiment is shown.

In this example, one of the communication cores, e.g., core 1 (communication core 102 from FIG. 1), requires time preservation aiding. Core 1 queries one of the other communication cores, e.g., core 2, determining the KPI of the core and requesting time preservation aiding services, if the KPI meets the criteria for core 1 (302). If core 2 is not able to provide such services (304), core 1 queries the next communication core (306). There may be several reasons why a particular communication core is not able to provide time preservation aiding services. For example, a particular communication core may be in an idle mode for power saving reasons, or the communication core may be busy performing other tasks, resulting in a drop of the latency, which would affect the KPI of the core. Or the core may not be meeting client expectations, resulting in a change in the KPI.

When core 1 finds a core that is able to provide the time preservation aiding services, core 1 requests for time preservation aiding. As a response core 3 response with accurate time preservation stamp (308) and hardware (HW) signaling when this time preservation arrives (310). Core 3 continues by sending a time preservation status report (312). The time preservation stamp may serve as the coarse time described above—a software level interface for time reporting. While the HW signaling provides the fine time interface. There may be situations where a particular communication core only wants coarse time. The HW signaling may be omitted in such a case.

As a result core 1 now has time preservation information. In fact, core 1 can now provide time preservation assistance if another core, e.g., core 2, requests assistance.

At any time, core 1 may need to switch to using another core, e.g., core 2 as the source for timing information. There may be a variety of reasons for this to happen. For example, core 3 may be switched to an idle state and be unable to perform signaling duties. Or core 3 may have been be receiving timing signals from an external source, but has lost connection to the external source. Or the performance of core 3 has otherwise deteriorated such that it does not meet the KPI criteria of the client. In a situation where core 1 needs to switch to another core, the flowchart of FIG. 3 can be followed to establish connection to a different timing source.

Any of the communication cores could be used as the timing source. There may be an instance where core 1 and core 3 switch places and core 1 becomes the timing source and core 3 becomes the client.

Figure 4:
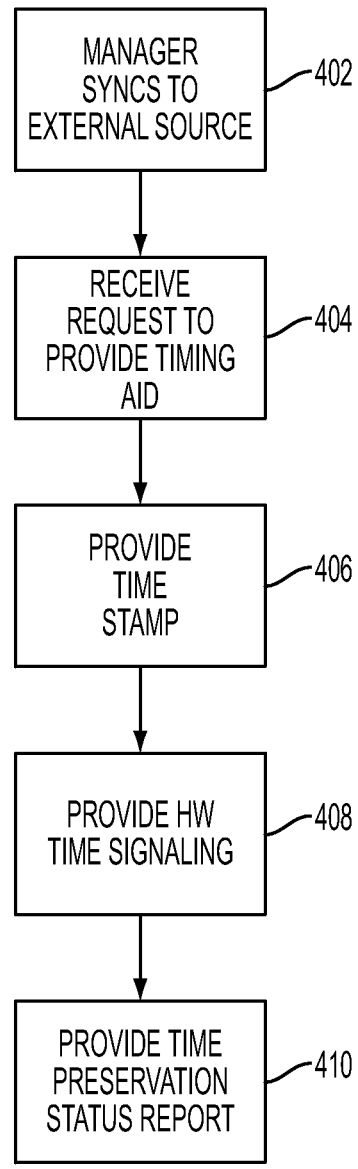
FIG. 4 is a flow chart illustrating the operation of another exemplary embodiment.

With reference to FIG. 4, a flowchart illustrating the operation of another embodiment using a centralized time preservation assistance and aiding manager is shown.

In this example, the time preservation assistance and aiding manager begins with acquiring initial time information from an external source (402). This external source may be any type of source of time, for example, a remote Network Time Protocol (NTP) server or another source for accurate time. The time preservation assistance and aiding manager may be configured to constantly search for an accurate time preservation source, to keep itself available for providing service of accurate time preservation assist.

With the time preservation assistance and aiding manager having an accurate clock, the communication cores do not need to request for time assistance from other communication cores. A communication core can make a request to the time preservation assistance and aiding manager (404). Thereafter, the time preservation assistance and aiding manager can provide a time stamp to the requesting communication core (406). The time preservation assistance and aiding manager can provide also provide hardware signaling with time information to the communication core (408). The time preservation assistance and aiding manager can also send a time preservation status report as needed (410).

There may be instances where a communication core only desires to find out the current time (406). This may occur if, for example, the communication core periodically checks if its own clock is accurate. Because of the presence of the time preservation assistance and aiding manager, a clock internal to a communication core need not be as accurate as was needed in the prior art, because the communication core can periodically request a time stamp from the time preservation assistance and aiding manager. In such a situation, establishing hardware signaling between the time preservation assistance and aiding manager and the communication core may not be necessary.

There may be instances when an external timing source is not available to the time preservation assistance and aiding manager. In such a situation, the time preservation assistance and aiding manager can use the procedure set forth with respect to FIG. 3, requesting time preservation aiding services from one of the communication cores. Thereafter, once the time preservation assistance and aiding manager has received timing information from one of the communication cores, it can act as the timing source for other communication cores.

Figure 5:
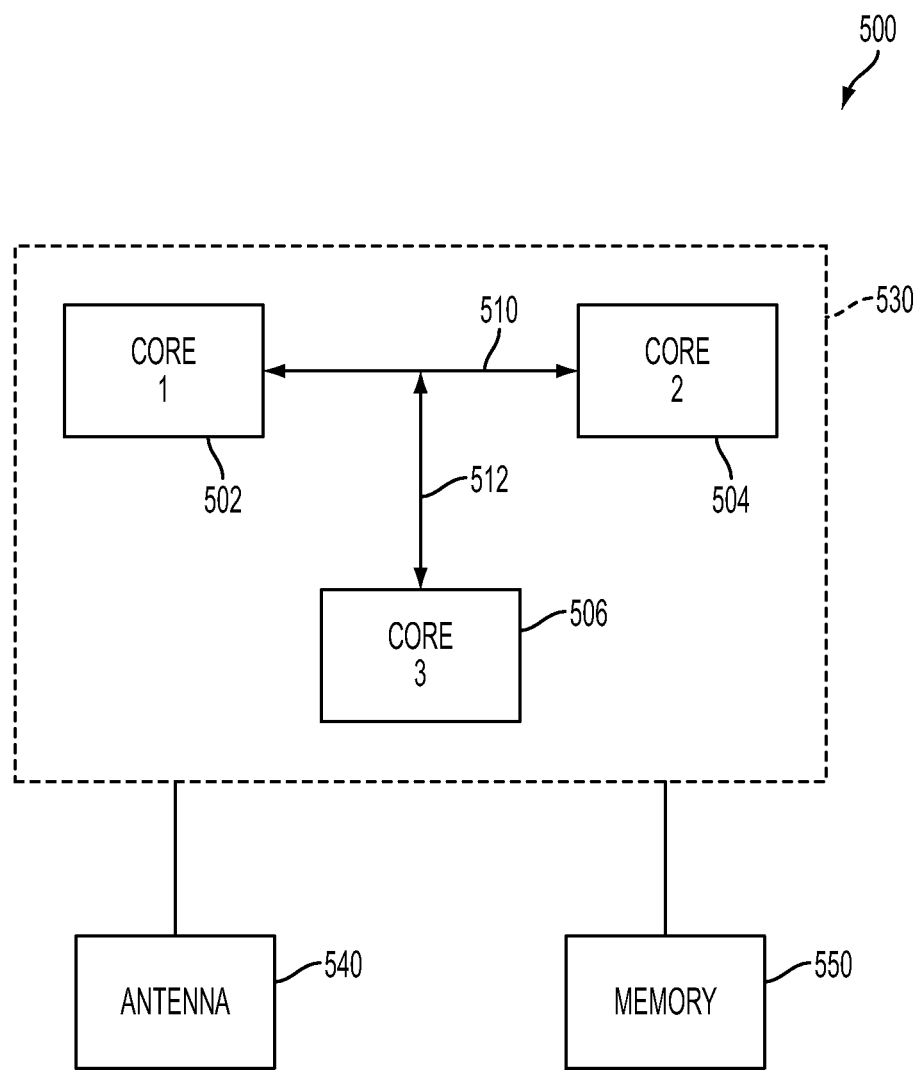
FIG. 5 is a block diagram illustrating a system containing an embodiment.

With reference to FIG. 5, a block diagram of a system using an embodiment is shown. Communication core 502, communication core 504, and communication core 506 may be as described above, with various connections between the communication cores, such as connection 510 and connection 512. It should be understood that there may be other connections between the cores that are not illustrated. Communication cores 502, 504, and 506 make up a device 530. Device 530 may or may not be contained within a single package. Device 530 is coupled to an antenna assembly 540. Communication cores 502, 504, and 506 would be configured to transmit and receive data using antenna assembly 540. Device 530 is also coupled to memory 550. Memory 550 may use any form of memory, such as RAM, flash memory, ROM, and the like. Memory 550 could be used to store programs to be executed on communication cores 502, 504, and 506, or other aspects of device 530 that are not shown. Memory 550 could also be used to store user data, such as a contact list, music, and the like. It should be understood that device 530 may contain many other components that are not illustrated in FIG. 5. Exemplary components may include user interfaces such as displays and keypads, speakers, and microphones, and any other component that may be used in a mobile communication device.

It should be understood that, although portions of this document discuss communication cores, it is not so limited. The concepts presented here may be applied to electronics with a plurality of any type of core, such as a computing core, or mixed cores, such as both computing cores and communication cores.

The following examples pertain to further embodiments.

A system may comprise a first communication core and a second communication core. The first communication core may be arranged to provide timing information to the second communication core and the second communication core is arranged to provide timing information to the first communication core.

In another embodiment, the first communication core is arranged to provide timing information via both software and hardware to the second communication core. The second communication core is arranged to provide timing information via both software and hardware to the first communication core.

In another embodiment, a time manager is coupled to both the first communication core and to the second communication core. The time manager may be arranged to provide timing information to the first communication core and the second communication core. The time manager may be further arranged to receive time information from a source external to the system.

In another embodiment, the time manager is further arranged to receive timing information from the first communication core and the second communication core.

In another embodiment, the system also comprises a third communication core, wherein the third communication core is arranged to select between said first communication core and said second communication core to provide timing information, based on Key Performance Indicators. Furthermore, the first communication core is arranged to select between said second communication core and said third communication core to provide timing information, based on Key Performance Indicators. In addition, the second communication core is arranged to select between said first communication core and said third communication core to provide timing information, based on Key Performance Indicators.

In another embodiment, the Key Performance Indicators include availability as a timing source, accuracy as a timing source, and reliability as a timing source.

A method for maintaining timing in a multiple-communication core system may comprise requesting time preservation services from a first communication core to a second communication core in the system and if the second communication core is able to provide time preservation services, transmitting a time-stamp from the second communication core to the first communication core.

In another embodiment, the method may further comprise establishing a hardware coupling for timing signals between said first communication core and said second communication core; and providing timing signaling over the hardware coupling.

In another embodiment, the method may further comprise: sending a time preservation status report from the second communication core to the first communication core.

In another embodiment, the method may further comprise terminating the hardware coupling if it is determined that the second communication core can no longer provide time preservation services.

A method for maintaining timing in a multiple-communication core system may comprise: initializing a timing manager within the system with timing information; requesting time preservation services from a communication core to the timing manager; and providing a time stamp from the timing manager to the communication core.

In another embodiment, the method may further comprise creating a time preservation status report.

In another embodiment, initializing the timing manager may comprise receiving timing information from an external source. The external source may be a network time protocol (NTP) server.

In another embodiment, the method may further comprise establishing a hardware coupling to provide a time signal from the timing manager to the communication core.

In another embodiment, initializing the timing manager may comprise receiving timing information from a communication core internal to the system.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention. It should be understood that, although embodiments were described in the context of a mobile communication device, the methods and systems described herein may be applicable to any piece of electronic equipment.

We claim:

1. A mobile device comprising:
   a mobile device core for Long Term Evolution (LTE) communications to communicate with a LTE network;
   a mobile device core for WiFi communications to communicate with a WiFi network; and
   a mobile device core for GPS communications to select between the core for LTE communications and the core for WiFi communications to provide timing information from one of a first timing source and a second timing source, respectively, based on Key Performance Indicators;
   wherein, said mobile device core for LTE communications is arranged to provide a first timing source to the mobile device core for WiFi communications;
   said mobile device core for WiFi communications is arranged to exchange timing information with the mobile device core for LTE communications,
   the mobile device core for LTE communications is arranged to select between the mobile device core for WiFi communications and the mobile device core for GPS communications to provide timing information from one of the second timing source and a third timing source, respectively, based on the Key Performance Indicators, and
   the mobile deviG(e core for WiFi communications is arranged to select between the mobile device core for LTE communications and the mobile device core for GPS communications to provide timing information from one of the first timing source and the third timing source, respectively, based on the Key Performance Indicators.

2. The mobile device of claim 1 wherein:
said mobile device core for LTE communications is arranged to provide the first timing source via both software and hardware to the mobile device core for WiFi communications; and
said mobile device core for WiFi communications is arranged to provide a second timing source via both software and hardware to the mobile device core for LTE communications.

3. The mobile device of claim 1 further comprising:
a time manager coupled to both said mobile device core for LTE communications and to said mobile device core for WiFi communications; wherein,
the time manager is arranged to provide a manager timing source to the mobile device core for LTE communications and the mobile device core for WiFi communications.

4. The mobile device of claim 3 wherein the time manager is further arranged to receive timing signals from a source external to the system.

5. The mobile device of claim 3 wherein the time manager is further arranged to receive a first timing source signal from the mobile device core for LTE communications and a second timing source signal from the mobile device core for WiFi communications.

6. The mobile device of claim 1 wherein said Key Performance Indicators include availability as a timing source, accuracy as a timing source, and reliability as a timing source.

7. A method comprising:
providing a mobile device core for Long Term Evolution (LTE) communications to communicate with an LTE network;
providing a mobile device core for WiFi communications to communicate with a WiFi network;
providing a first timing source at the mobile device core for LTE communications to the mobile device core for WiFi communications;
a mobile device core for GPS communications to select between the mobile device core for LTE communications and the mobile device core for WiFi communications to provide timing information from one of a first timing source and a second timing source, respectively, based on Key Performance Indicators;
exchanging timing information from the mobile device core for WiFi communications to the mobile device core for LTE communications;
selecting, by the mobile device core for LTE communications, between the mobile device core for WiFi communications and the mobile device core for GPS communications to provide timing information from one of the second timing source and a third timing source, respectively, based on the Key Performance Indicators; and
selecting, by the mobile device core for WiFi communications, between the mobile device core for LTE communications and the mobile device core for GPS communications to provide timing information from one of the first timing source and the third timing source, respectively, based on the Key Performance Indicators.

8. The method of claim 7, further comprising:
providing the first timing source via both software and hardware; and
providing a second timing source at the mobile device core for WiFi communications, via both software and hardware to the mobile device core for LTE communications.

9. The method of claim 7, further comprising:
providing a time manager coupled to both the mobile device core for LTE communications and the mobile device core for WiFi communications; and
providing a manager timing source at the time manager to the mobile device core for LTE communications and the mobile device core for WiFi communications.

10. The method of claim 9, further comprising:
receiving timing signals at the time manager from a source external to the system.

11. The method of claim 9, further comprising:
receiving a first timing source signal from the mobile device core for LTE communications and a second timing source signal from the mobile device core for WiFi communications at the time manager.

12. The method of claim 7, wherein the Key Performance Indicators include availability as a timing source, accuracy as a timing source, and reliability as a timing source.

13. A non-transitory computer-readable medium including instructions that, when executed on a mobile device, cause the mobile device to perform operations including:
providing a mobile device core for Long Term Evolution (LTE) communications to communicate with an LTE network;
providing a mobile device core for WiFi communications to communicate with a WiFi network;
providing a first timing source at the mobile device core for LTE communications to the mobile device core for WiFi communications;
a mobile device core for GPS communications to select between the mobile device core for LTE communications and the mobile device core for WiFi communications to provide timing information from one of a first timing source and a second timing source, respectively, based on Key Performance Indicators;
exchanging timing information from the mobile device core for WiFi communications to the mobile device core for LTE communications;
selecting, by the mobile device core for LTE communications, between the mobile device core for WiFi communications and the mobile device core for GPS communications to provide timing information from one of the second timing source and a third timing source, respectively, based on the Key Performance Indicators; and
selecting, by the mobile device core for WiFi communications, between the mobile device core for LTE communications and the mobile device core for GPS communications to provide timing information from one of the first timing source and the third timing source, respectively, based on the Key Performance Indicators.

14. The non-transitory computer-readable medium of claim 13, including instructions that, when executed on the mobile device, cause the mobile device to perform operations including:
providing a second timing source at the mobile device core for WiFi communications, via both software and hardware to the mobile device core for LTE communications.

15. The non-transitory computer-readable medium of claim 13, including instructions that, when executed on the mobile device, cause the mobile device to perform operations including:
providing a time manager coupled to both the mobile device core for LTE communications and the mobile device core for WiFi communications; and
providing a manager timing source at the time manager to the mobile device core for LTE communications and the mobile device core for WiFi communications.

16. The non-transitory computer-readable medium of claim 15, including instructions that, when executed on the mobile device, cause the mobile device to perform operations including:
   receiving timing signals at the time manager from a source external to the system.

17. The non-transitory computer-readable medium of claim 15, including instructions that, when executed on the mobile device, cause the mobile device to perform operations including:
   receiving a first timing source signal from the mobile device core for LTE communications and a second timing source signal from the mobile device core for WiFi communications at the time manager.

18. The non-transitory computer-readable medium of claim 13, wherein the Key Performance Indicators include availability as a timing source, accuracy as a timing source, and reliability as a timing source.

* * * * *